United States Patent
Kim et al.

(10) Patent No.: US 10,716,159 B2
(45) Date of Patent: Jul. 14, 2020

(54) METHOD AND USER EQUIPMENT FOR CONNECTING BY MEANS OF PLURALITY OF ACCESSES IN NEXT GENERATION NETWORK

(71) Applicant: LG Electronics Inc., Seoul (KR)

(72) Inventors: Hyunsook Kim, Seoul (KR); Laeyoung Kim, Seoul (KR); Sangmin Park, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/327,724

(22) PCT Filed: Jul. 31, 2017

(86) PCT No.: PCT/KR2017/008210
§ 371 (c)(1),
(2) Date: Feb. 22, 2019

(87) PCT Pub. No.: WO2018/038412
PCT Pub. Date: Mar. 1, 2018

(65) Prior Publication Data
US 2019/0208562 A1    Jul. 4, 2019

Related U.S. Application Data

(60) Provisional application No. 62/378,224, filed on Aug. 23, 2016.

(51) Int. Cl.
*H04W 76/16* (2018.01)
*H04W 88/06* (2009.01)
(Continued)

(52) U.S. Cl.
CPC ........... *H04W 76/16* (2018.02); *H04W 48/14* (2013.01); *H04W 48/18* (2013.01); *H04W 60/00* (2013.01); *H04W 88/06* (2013.01)

(58) Field of Classification Search
CPC ..... H04W 76/16; H04W 48/14; H04W 48/18; H04W 60/00; H04W 88/06
See application file for complete search history.

(56) References Cited

U.S. PATENT DOCUMENTS 9,088,960 B2 *   7/2015   Menon .................. H04W 68/00
2015/0188681 A1   7/2015   Li et al.
(Continued)

FOREIGN PATENT DOCUMENTS

KR    1020160097197    8/2016
WO    WO2016126238    8/2016

OTHER PUBLICATIONS

LG Electronics, "Control Plane Interface for MM and SM Support", S2-163366, SA WG2 Meeting #116, Vienna, AT, dated Jul. 5, 2016, 7 pages.
(Continued)

*Primary Examiner* — Curtis A Alia
(74) *Attorney, Agent, or Firm* — Fish & Richardson P.C.

(57) ABSTRACT

A method for a user equipment (UE) connecting to a network includes: if second connection is to be executed by means of a second access, determining whether or not first connection has been previously executed by means of a first access; and, if the first connection by means of the first access has been executed and the second connection by means of the second access is determined to be an addition, transmitting a connection request message comprising identification information of a control plane (CP) function node. The identification information of the control plane (CP) function node could have been obtained during the first connection by means of the first access. Both the first connection by means of the first access and the second connection by means of the second access can be managed by means of the control plane (CP) function node.

12 Claims, 19 Drawing Sheets

(51) Int. Cl.
*H04W 48/14* (2009.01)
*H04W 48/18* (2009.01)
*H04W 60/00* (2009.01)

(56) References Cited

U.S. PATENT DOCUMENTS

2015/0319662 A1* 11/2015 Enomoto .............. H04W 36/14
 370/338
2015/0341830 A1 11/2015 Jeong
2017/0005981 A1* 1/2017 Wang .................. H04L 61/2046

OTHER PUBLICATIONS

PCT International Search Report in International Appln. No. PCT/KR2017/008210, dated Oct. 18, 2017, 4 pages.

3rd Generation Partnership Project; Technical Specification Group Services and System Aspects, "Study on Architecture for Next Generation System (Release 14)", 3GPP TR 23.799 V0.7.0, Aug. 2016, 549 pages.

3rd Generation Partnership Project; Technical Specification Group Services and System Aspects, "Study on Architecture for Next Generation System (Release 14)", 3GPP TR 23. 799 V14.0.0, Dec. 2016, 300 pages.

EP Supplementary Search Report in European Application No. EP 17843832, dated Apr. 3, 2020, 9 pages.

Huawei, "Solution evaluation and selection for UE simultaneously connected to 3GPP and N3GPP (sol 4.20 and 4.24)", S2-165682, SA WG2 Meeting #117, Oct. 17-21, 2016, Kaohsiung, 13 pages.

LG Electronics, "Clarification and evaluation about solution 4.20 (Session Management on the PDU session(s) via different accesses)", S2-166549, SA WG2 Meeting #118, Nov. 14-18, 2016, Reno, Nevada, USA, 5 pages.

\* cited by examiner

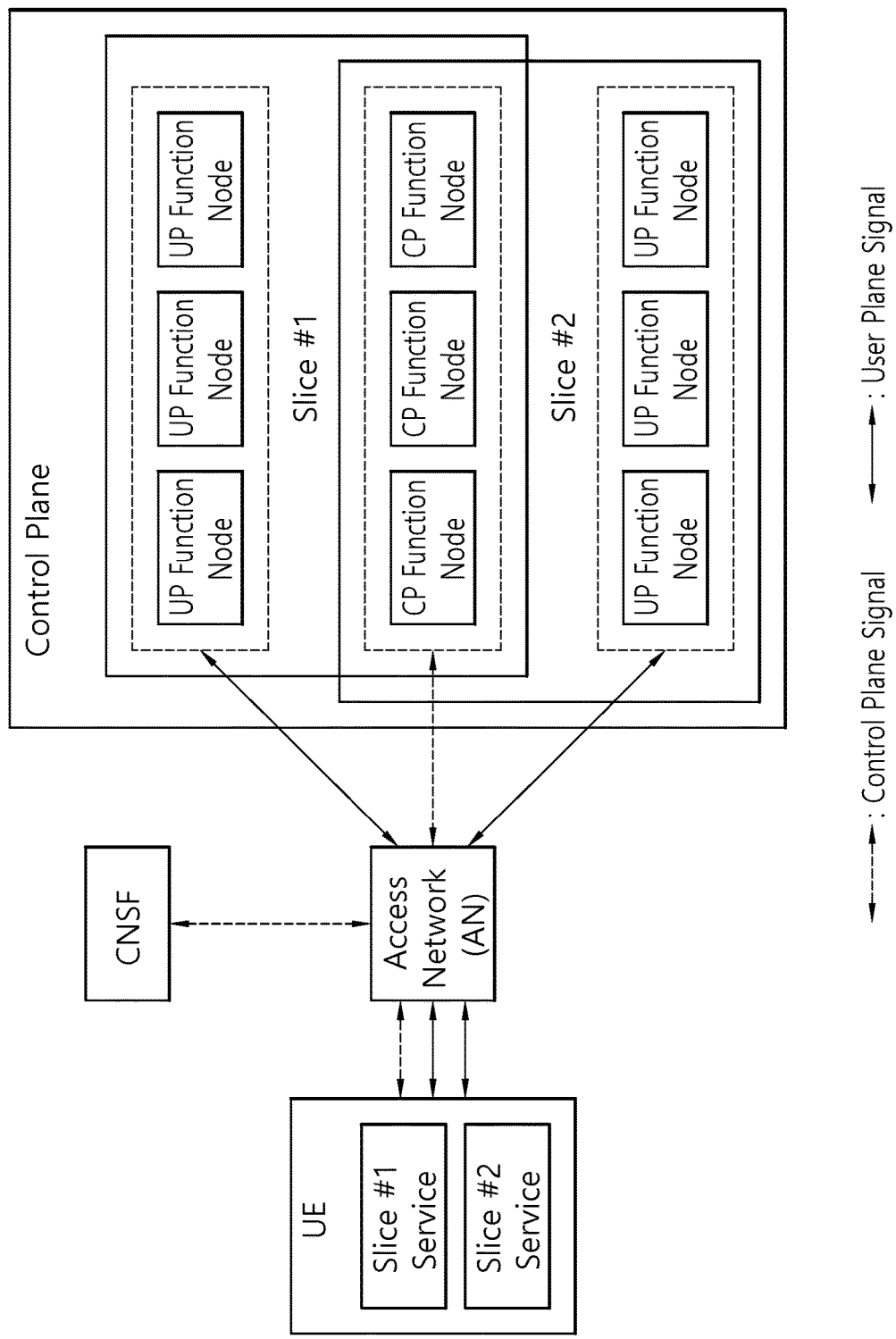

METHOD AND USER EQUIPMENT FOR CONNECTING BY MEANS OF PLURALITY OF ACCESSES IN NEXT GENERATION NETWORK

CROSS-REFERENCE TO RELATED APPLICATIONS

This application is a National Stage application under 35 U.S.C. § 371 of International Application No. PCT/KR2017/008210, filed on Jul. 31, 2017, which claims the benefit of U.S. Provisional Application No. 62/378,224, filed on Aug. 23, 2016. The disclosures of the prior applications are incorporated by reference in their entirety.

BACKGROUND OF THE INVENTION

Field of the Invention

The present invention relates to a next generation mobile communication

Related Art

Thanks to the success of the Long Term Evolution (LTE)/LTE-Advanced (LTE-A) for the 4-th generation mobile communication, interest for future mobile communication, namely 5-th mobile communication is getting higher, and researches on the 5-th mobile communication are started one after another.

It is expected that in the next generation mobile communication, namely the 5-th mobile communication, data services with a minimum speed of 1 Gbps will be realized. These high-speed services seem to be difficult to be accommodated by the core network designed for the conventional LTE/LTE-A.

Therefore, redesign of the core network is urgently required in the so-called fifth generation mobile communication.

FIG. 1A illustrates an expected structure of the next-generation mobile communication from the viewpoint of a node.

As may be seen with reference to FIG. 1A, a UE may access the core network through a next-generation Radio Access Network (RAN). The next-generation core network may include a control plane (CP) function node and a user plane (UP) function node. The CP function node, which is a node for managing UP function nodes and RAN, transmits and receives a control signal. The CP function node performs all or part of the functions of a Mobility Management Entity (MME) in the fourth generation mobile communication; and all or part of the control plane functions of a Serving Gateway (S-GW) and a PDN Gateway (P-GW). The UP function node is a kind of gateway through which user data are transmitted and received. The UP function node may perform all or part of the user plane functions of the S-GW and the P-GW in the fourth generation mobile communication.

The Policy Control Function (PCF) in the figure is a node for controlling the policies of a service provider. And the subscriber information server shown stores subscription information of a user.

FIG. 1B illustrates an expected structure of the next-generation mobile communication from the viewpoint of a session.

As shown in the figure, the core network is divided into a control plane (CP) and a user plane (UP). The control plane (CP) may include a policy control function (PCF), a subscriber information server, and a CP node which performs session management (SM). And the user plane (UP) may include a UP function node. The nodes within the control plane (CP) are implemented through cloud virtualization. And so are the nodes within the user plane (UP).

The UE may request creation of a session directed to a data network (DN) through an access network (AN). The session may be created and managed by the CP node for session management (SM). At this time, the session management may be performed according to the information stored in the subscriber information server and the policies (for example, a QoS management policy) of a service provider stored within the policy control function (PCF) entity. In other words, if receiving a request for creation/modification/release of a session from the UE, the CP node for session management (SM) obtains the information through interaction with the subscriber information server and the policy control function (PCF) and creates/modifies/releases the session. Also, the CP node for session management (SM) selects a UP function node for the session and allocates resources of the core network. Also, the CP node for session management (SM) may allocate an IP address directly to the UE or request the UP function node to allocate an IP address to the UE Meanwhile, in a next-generation mobile communication, it is expected that a UE may generate a plurality of sessions over different access networks.

However, if a UE has a plurality of NG1 connections with a core network, a detailed scheme regarding how the NG1 connections will be processed has not been proposed by a current technology. Furthermore, a detailed scheme for processing the plurality of NG1 connections from the viewpoint of mobility management has not yet been proposed.

Furthermore, a detailed scheme regarding how a CP function node will process a plurality of sessions generated through a plurality of accesses has not been proposed.

Specifically, whether one CP function node has to manage a plurality of sessions generated through a plurality of accesses or individual CP function nodes have to manage them has not been specifically determined.

SUMMARY OF THE INVENTION

The present invention proposes schemes for solving the above-described problems.

In an aspect, one disclosure of this specification provides a method for performing access to a network. The method may be performed by a user equipment (UE) and include determining whether a first connection has been previously performed through a first access when attempting to perform a second connection through a second access and transmitting an attach request message including identifier information of a control plane (CP) function node if the first connection through the first access has been performed and the second connection through the second access is determined to be additional. The identifier information of the control plane (CP) function node may have been obtained in a process of performing the first connection through the first access. Both the first connection through the first access and the second connection through the second access may be managed by the control plane (CP) function node.

The method may further include transmitting a connection request message in order to perform the first connection through the first access, and receiving an accept message including the identifier information of the control plane (CP) function node as a response to the request message.

The first access may be a next-generation access network defined based on a 3rd generation partnership project (3GPP), and the second access may be a non-3GPP-based access network.

The identifier information of the control plane (CP) function node may be unique identifier information used in common in a next-generation access network defined based on the 3GPP and the non-3GPP-based access network.

The method may further include transmitting a connection request message not including the identifier information if the first connection through the first access has not been performed and the second connection through the second access may be determined to be first.

The connection request message may include a registration request message or an attach request message, and the accept message may include a registration accept message or an attach accept message.

The method may further include receiving a reject message as a response to the connection request message. The reject message may include a cause field in which a value indicating that the UE has not been previously registered or a value indicating that the identifier information is erroneous has been configured.

In an aspect, one disclosure of this specification provides a user equipment (UE) for performing a connection with a network. The user equipment a transceiver and a processor controlling the transceiver. The processor may perform a process of determining whether a first connection has been previously performed through a first access when attempting to perform a second connection through a second access, and a process of transmitting an attach request message including identifier information of a control plane (CP) function node if the first connection through the first access has been performed and the second connection through the second access may be determined to be additional. The identifier information of the control plane (CP) function node may have been obtained in a process of performing the first connection through the first access. Both the first connection through the first access and the second connection through the second access may be managed by the control plane (CP) function node.

According to the disclosures of this specification, the above-described problems are solved.

BRIEF DESCRIPTION OF THE DRAWINGS

FIG. 3 illustrates another example of the architecture for implementing network slicing.

DESCRIPTION OF EXEMPLARY EMBODIMENTS

Figure 1A:
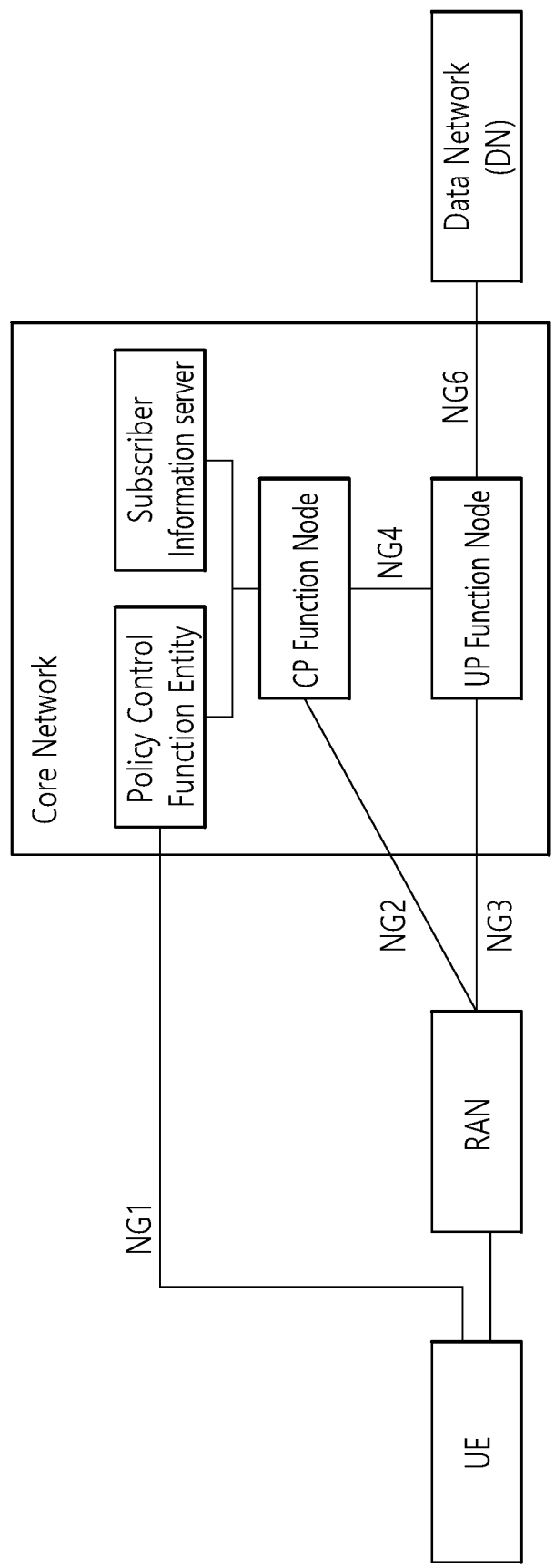
FIG. 1A illustrates an expected structure of the next-generation mobile communication from the viewpoint of a node.
Figure 1B:
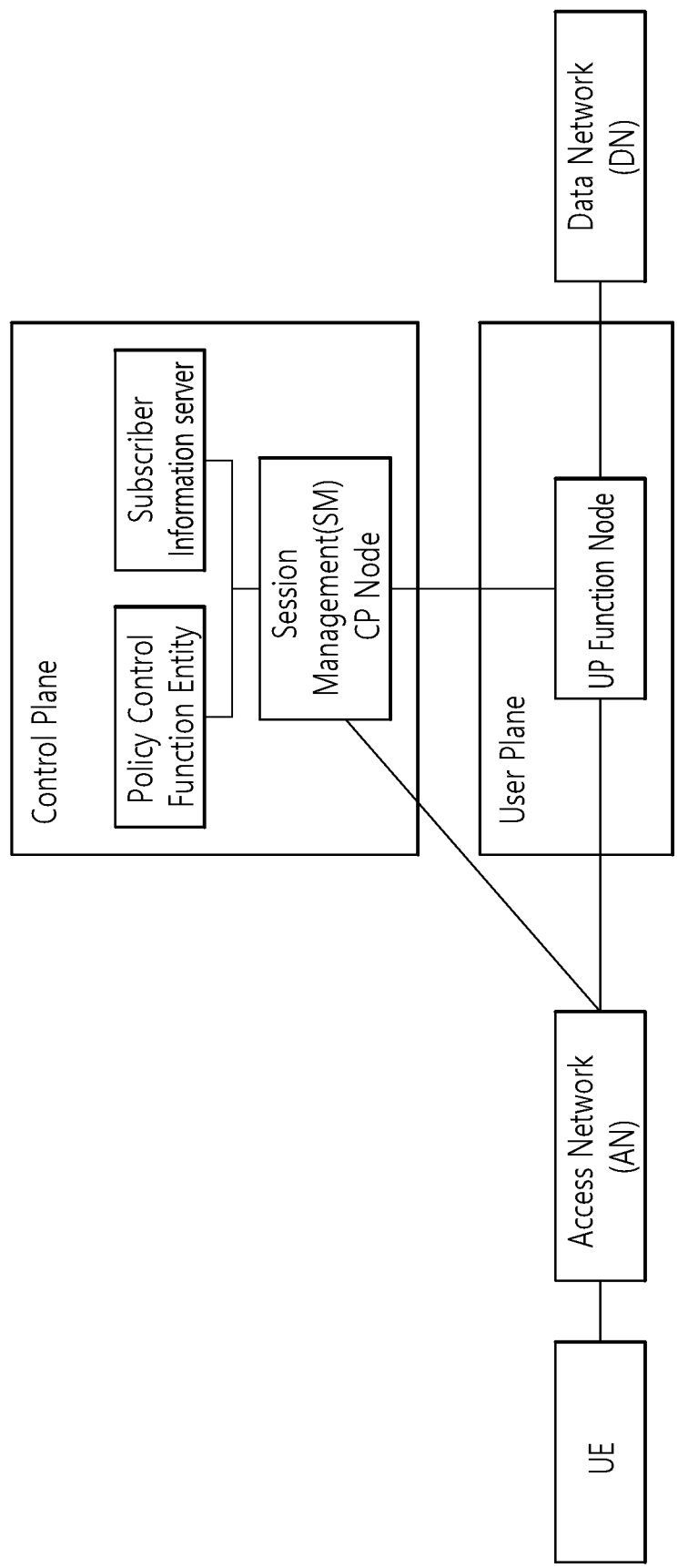
FIG. 1B illustrates an expected structure of the next-generation mobile communication from the viewpoint of a session.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply. The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

APDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is divided into a home PLMN (HPLMN) and a visited PLMN (VPLMN).

Next generation (NG) radio access network (RAN): means a radio access network including a base station in next-generation mobile communication defined by 3GPP.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

Figure 2:
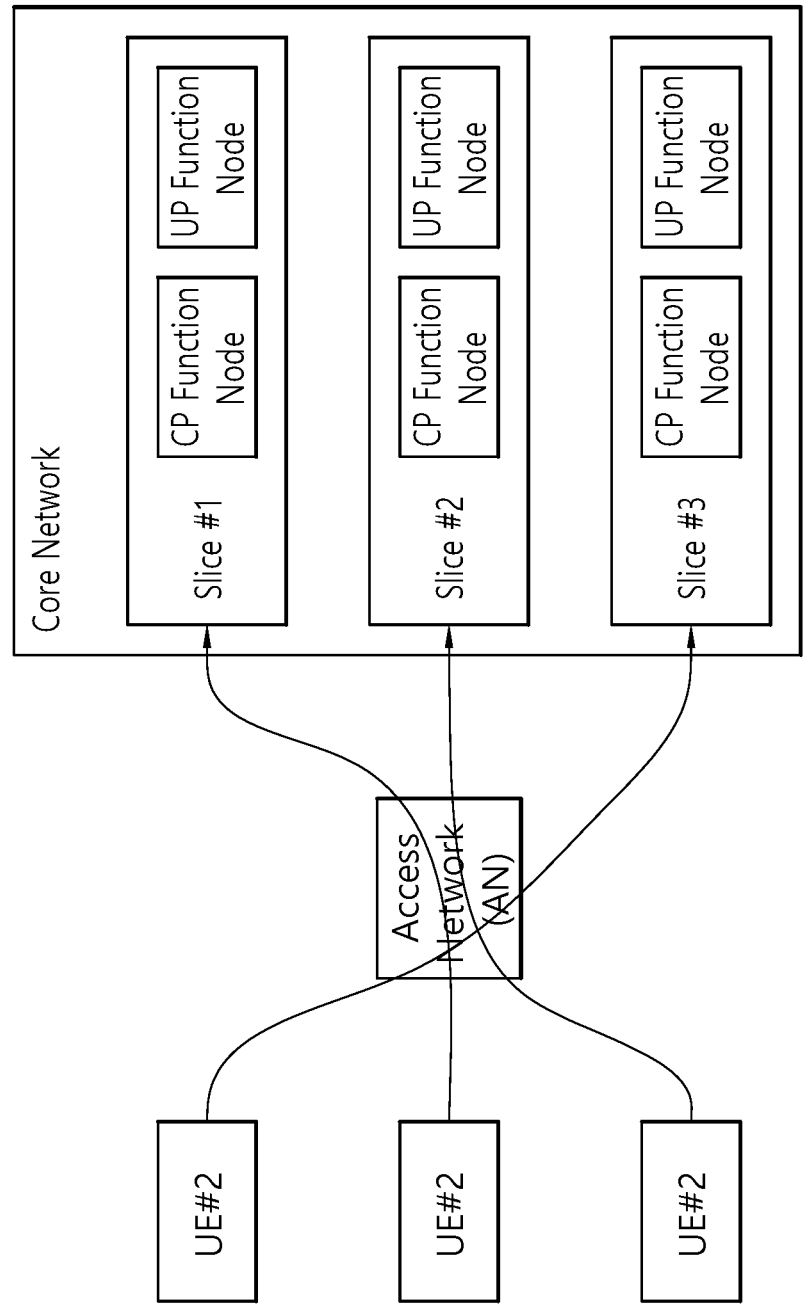
FIG. 2 illustrates an example of architecture for implementing network slicing.

FIG. 2 illustrates an example of architecture for implementing network slicing.

As may be noticed with reference to FIG. 2, the core network (CN) may be divided into several slice instances. Each slice instance may include one or more of a CP function node and a UP function node.

Each UE may use a network slice instance relevant to its service through the access network (AN).

Different from FIG. 2, each slice instance may share one or more of the CP function node and the UP function node with other slide instance. This feature will be described with reference to FIG. 3 below.

FIG. 3 illustrates another example of the architecture for implementing network slicing.

Referring to FIG. 3, a plurality of UP function nodes are clustered, and a plurality of CP function nodes are also clustered.

And referring to FIG. 3, slice instance #1 within the core network (which is also called instance #1) includes a first cluster of UP function nodes. And the slice instance #1 shares the cluster of CP function nodes with slice #2 (which is also called instance #2). The slice instance #2 includes a second cluster of UP function nodes.

The Core Network Selection Function (CNSF) shown in the figure selects a slice (or instance) capable of accommodating a service of the UE.

The UE in the figure may use the service #1 through the slice instance #1 selected by the CNSF and also use the service #2 through the slice instance #2 selected by the CNSF.

So far, the concept of network slicing has been described. It should be noted, however, that a specific method for realizing the network slicing concept has not been proposed yet. Moreover, considering actual implementation and commercialization of the network slicing concept, architecture for network slicing needs to be improved and optimized further. Also, in order for a UE to receive a plurality of services through a plurality of slice instances, a method for creating and managing a plurality of sessions is needed.

<Management of Session in Next-Generation Mobile Communication>

In next-generation mobile communication, a UE may establish one or more protocol data unit (PDU) sessions through several accesses (i.e., several radio access technology (RAT)).

Specifically, the UE may generate a plurality of PDU sessions toward several data networks through a plurality of accesses.

Alternatively, the UE may generate a plurality of PDU sessions toward one identical data network through a plurality of accesses.

Alternatively, the UE may generate one PDU session toward one identical data network through a plurality of accesses.

This is described below with reference to the drawings.

Figure 4A:
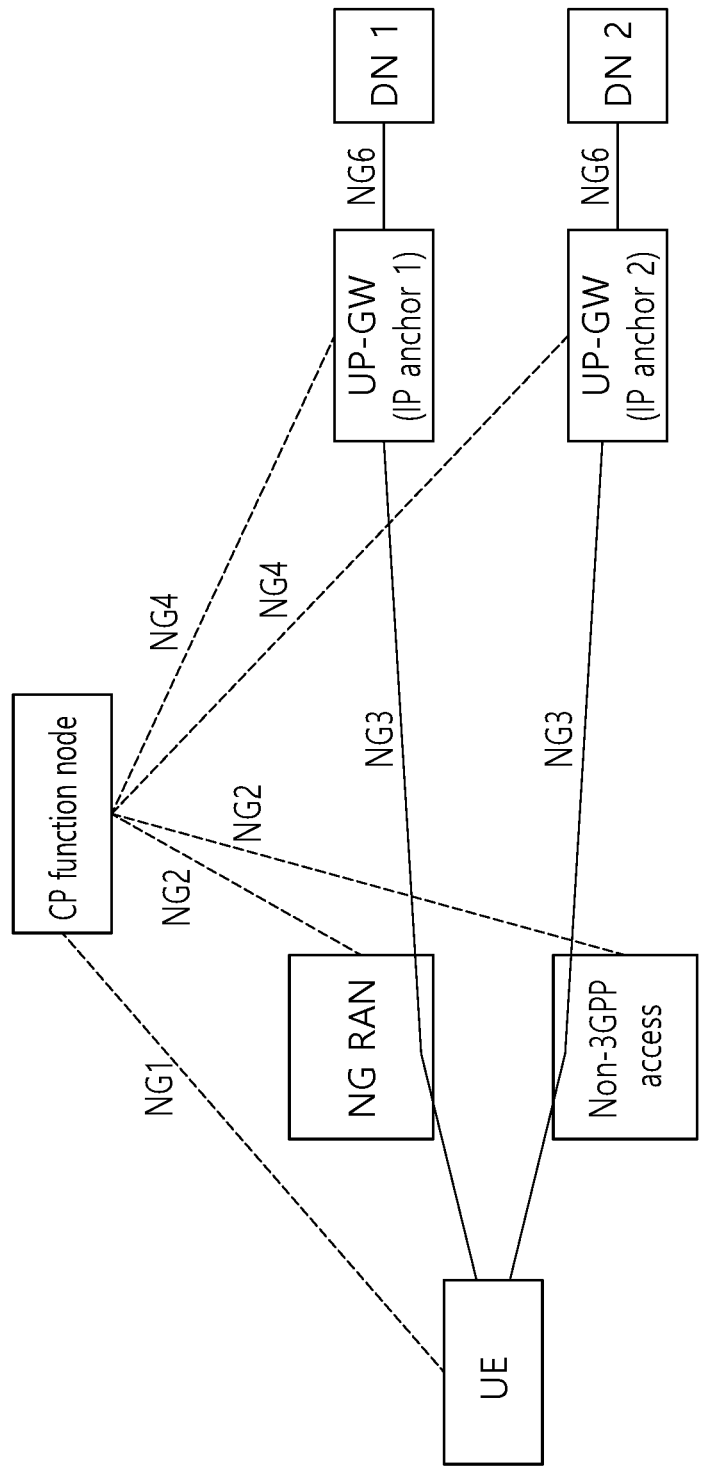
FIGS. 4A to 4C are exemplary diagrams showing examples of sessions generated through a plurality of accesses.
Figure 4B:
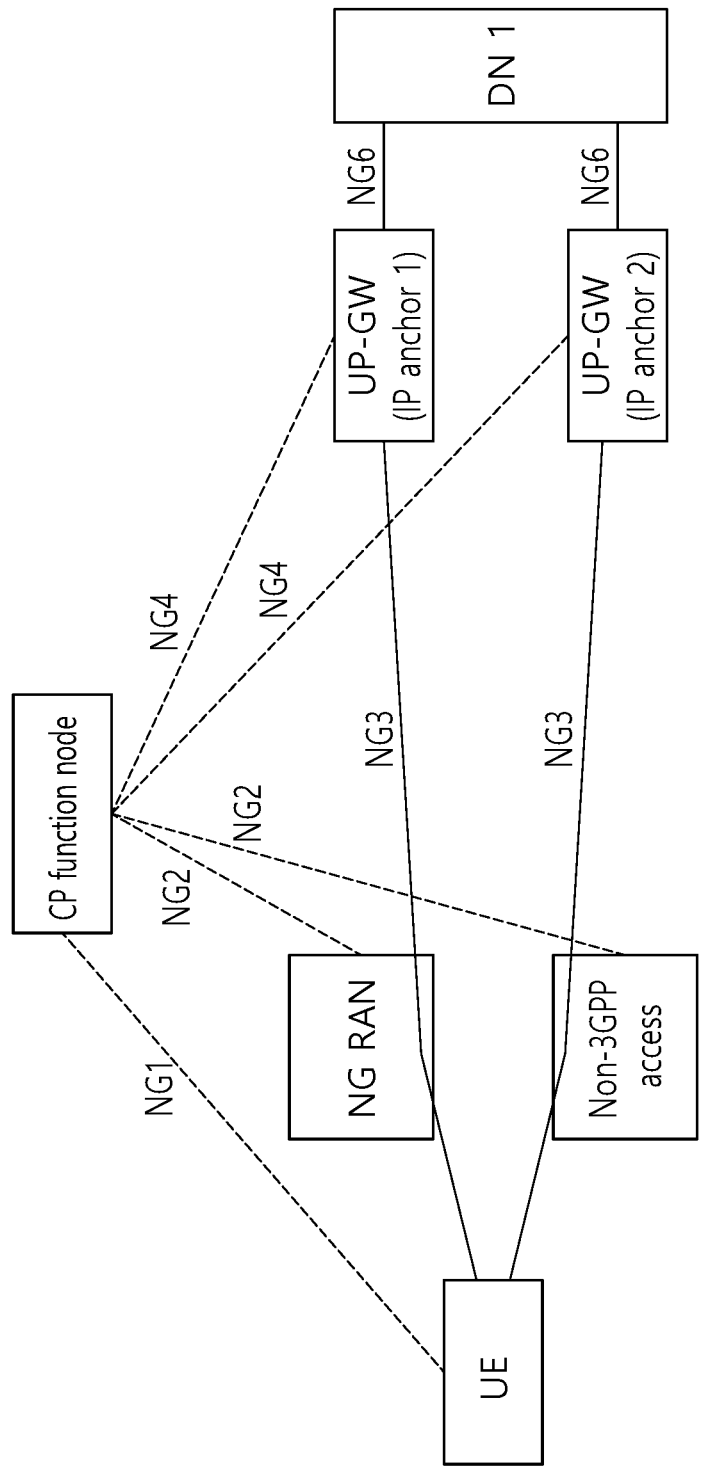
Figure 4C:
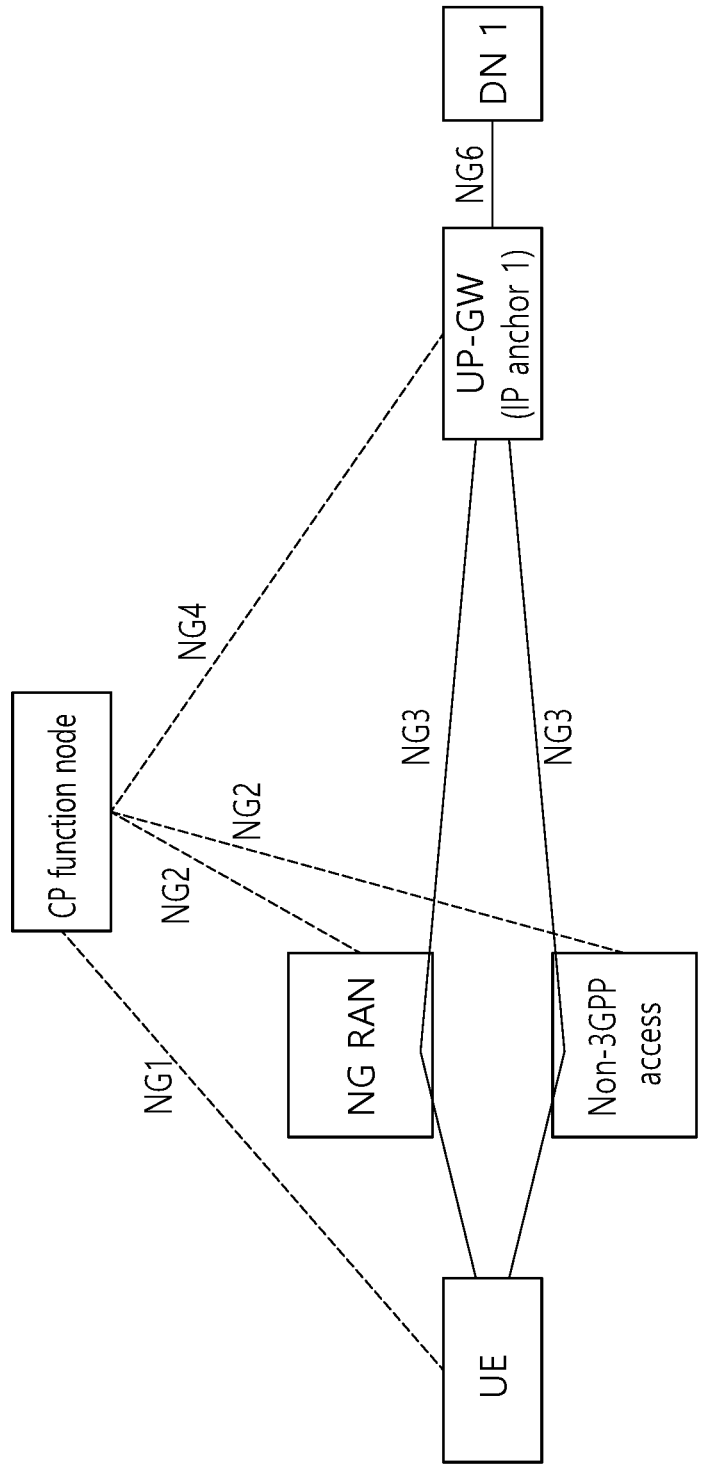

FIGS. 4A to 4C are exemplary diagrams showing examples of sessions generated through a plurality of accesses.

As may be seen with reference to FIG. 4A, a UE may have a plurality of sessions toward several data networks (e.g., shown DN 1 and DN 2) through several accesses (e.g., 3GPP accesses, for example, shown NG RAN and non-3GPP access). In this case, the non-3GPP access may mean an access not defined by 3GPP, for example, a wireless local area network (WLAN) access point (AP).

Alternatively, as may be seen with reference to FIG. 4B, a UE may have a plurality of sessions toward one data network (e.g., shown DN 1) through several accesses (e.g., 3GPP accesses, for example, shown NG RAN and non-3GPP access). In this case, in FIG. 4B, a session through a first access (shown 3GPP access, for example, shown NG RAN) is directed toward the data network via an IP anchor 1, and a session through a second access (shown non-3GPP access) is directed toward the same data network via an IP anchor 2.

In FIG. 4C, both a first session through a first access (shown 3GPP access, for example, shown NG RAN) and a second session through a second access (shown non-3GPP access) have been illustrated as being directed toward the same data network through one identical anchor 1.

The generation and release of the first session through the first access (shown 3GPP access, for example, shown NG RAN) may be performed through NG1 signaling. The generation and release of the second session through the second access (shown non-3GPP access) may also be performed through the NG1 signaling.

Accordingly, in next-generation mobile communication, session management (SM) context must have information on an access network type.

Figure 5A:
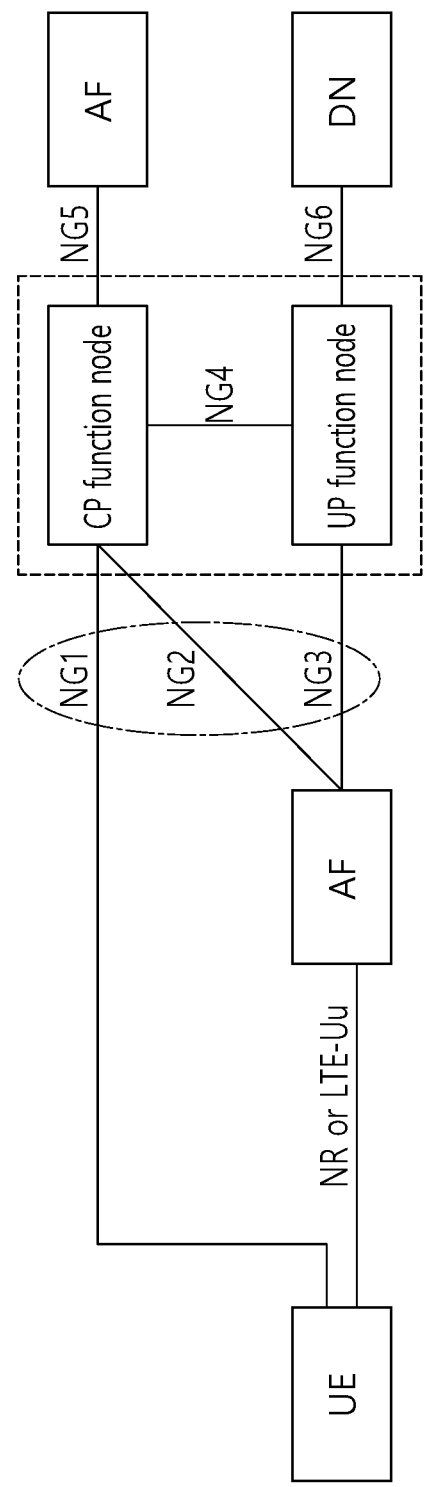
FIGS. 5A to 5C show architecture for managing sessions generated through a plurality of accesses.
Figure 5B:
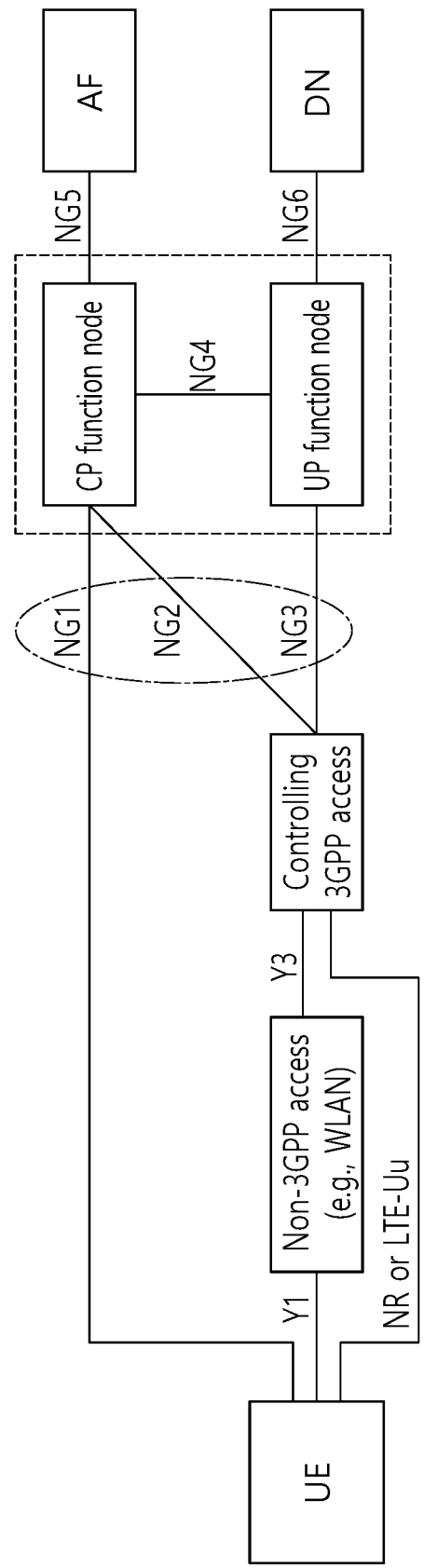
Figure 5C:
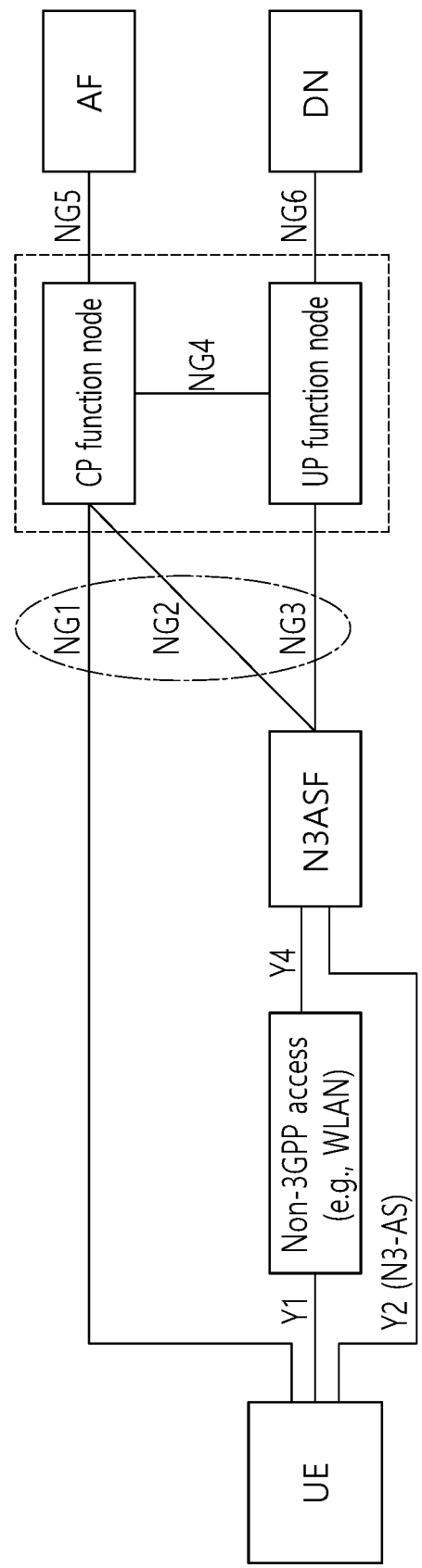

FIGS. 5A to 5C show architecture for managing sessions generated through a plurality of accesses.

The architecture shown in FIG. 5A shows an example in which only a 3GPP access is used.

The architecture shown in FIG. 5B is for a case where a non-3GPP access is installed within coverage of a 3GPP access. Furthermore, the architecture shown in FIG. 5C is for a case where a non-3GPP access is solely installed.

As shown, a core network for next-generation mobile communication may be divided into a CP function node and an UP function node.

Shown interfaces are as follows.

Y1: an interface between a UE and a non-3GPP access (e.g., WLAN)

Y2: an interface between the UE and a non-3GPP access layer function (N3ASF). A protocol used through Y2 may be called a non-3GPP access stratum (N3-AS) protocol.

Y3: an interface between a controlling 3GPP access and a non-3GPP access.

Y4: an interface between the N3ASF and the non-3GPP access.

Meanwhile, in FIGS. 5B and 5C, all the interfaces NG1, NG2, and NG3 are exposed to the core network.

However, in FIG. 5C, the interfaces NG2 and NG3 are connected to the non-3GPP access layer function (N3ASF). Furthermore, in the architecture shown in FIG. 5C, a non-3GPP access stratum (N3-AS) protocol is used between the UE and the N3ASF.

Figure 6:
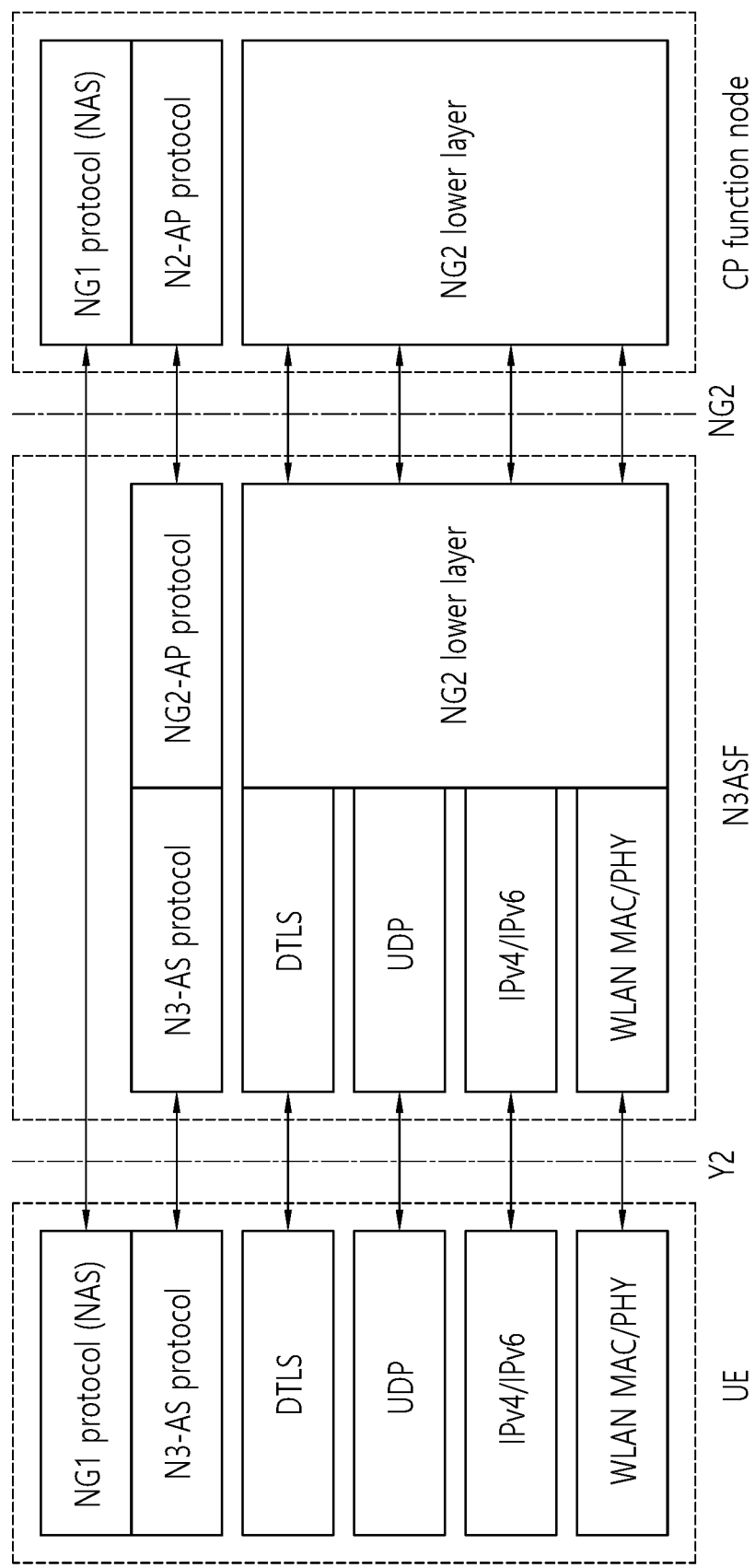
FIG. 6 shows a protocol stack between a UE and an N3ASF and a CP function.

FIG. 6 shows a protocol stack between a UE and an N3ASF and a CP function.

An N3-AS protocol of protocol stacks shown in FIG. 6 is used between a UE and an N3ASF. The N3-AS may be compared with RRC in terms of the location of the protocol stack. When compared with RRC, the N3-AS protocol has a simpler radio resource control function. The N3-AS protocol includes security information, and is chiefly used to exchange information on the bearer of a user plane between the UE and the N3ASF and to transparently transmit NAS messages between the UE and a core network (CN).

Figure 7:
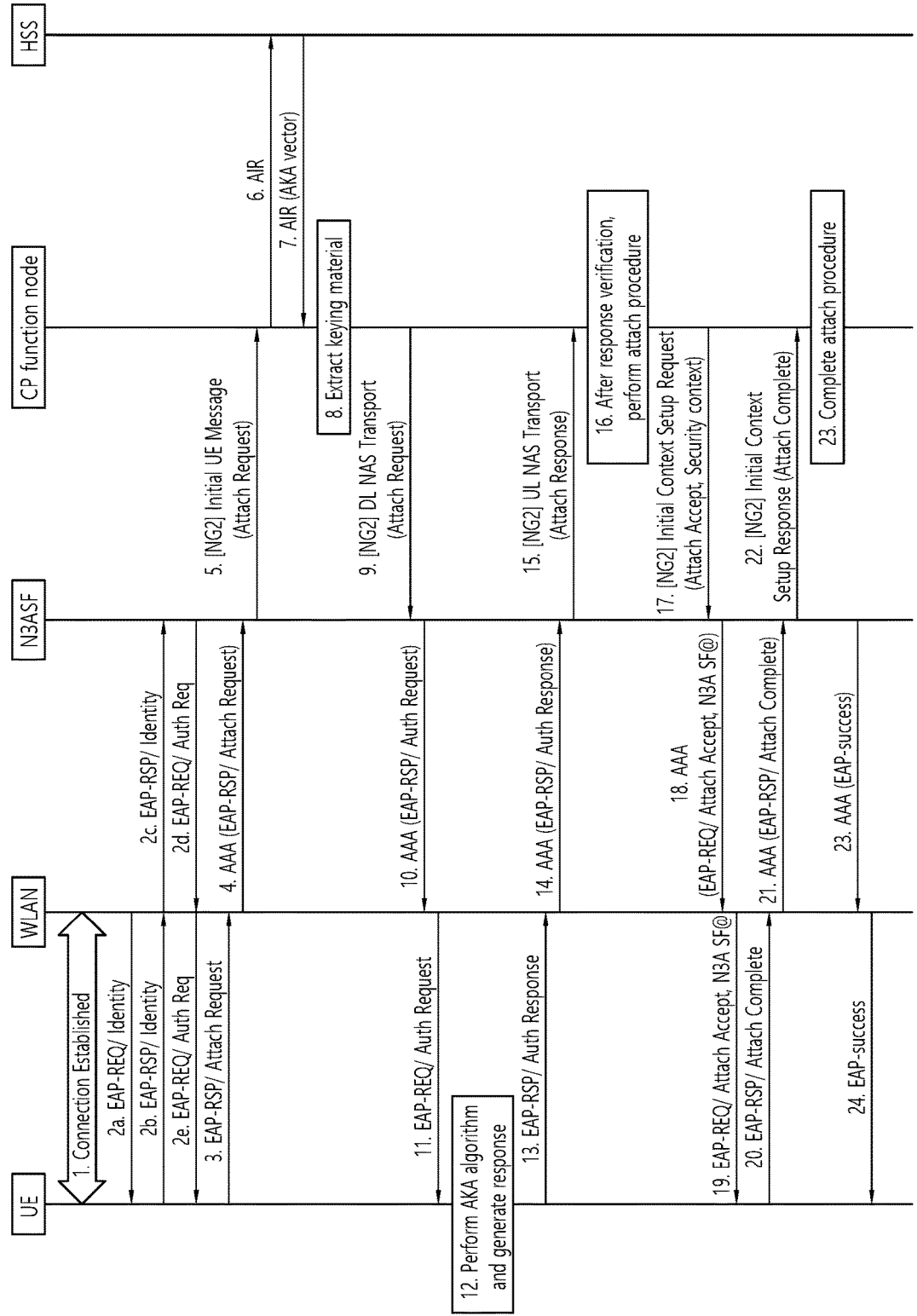
FIG. 7 an example in which the UE performs an attach procedure through a non-3GPP access the environment shown in FIG. 5C.

FIG. 7 an example in which the UE performs an attach procedure through a non-3GPP access the environment shown in FIG. 5C.

In the example shown in FIG. 7, it is assumed that the following protocols and the following assumptions are used.
- an EAP-over-EAPoL protocol is used between a UE and a WLAN.
- an EAP is used within a protocol between the WLAN and an N3ASF.
- The EAP is improved and extended to transmit an NAS message for an attach procedure.

This is specifically as follows.

1) Before a UE attempts a connection configuration, the UE may find the attributes/performance of the WLAN (e.g., using new parameters of an ANQP procedure or 802.11 beacon/probe request/probe response message). In this manner, the UE may find that a cellular NAS attach request message must be included as part of WLAN access authentication.

3-4). An NAS attach request message is delivered through an EAP-RSP message.

10-11). An NAS authentication request message is delivered through an EAP-REQ message.

12) The UE induces a key material for protecting an N3-AS connection.

13-14). An NAS authentication response message is delivered through an EAP-RSP message.

17) In order to derive a keying material for protecting the N3-AS connection, access-independent security context used by the N3ASF is provided.

18-19) An NAS attach accept message is delivered through an EAP-REQ message. Furthermore, information for the bootstrap of an N3-AS protocol connection is also provided. The type of bootstrap information may be different depending on an N3-AS protocol stack. For example, the bootstrap information may include the IP address and UDP port number of the N3ASF.

20-21) An NAS attach complete message is delivered through an EAP-RSP message.

When the attach procedure is completed, the UE and the N3ASF use an N3-AS protocol for an additional message exchange (e.g., session management or mobility management procedure).

Figure 8:
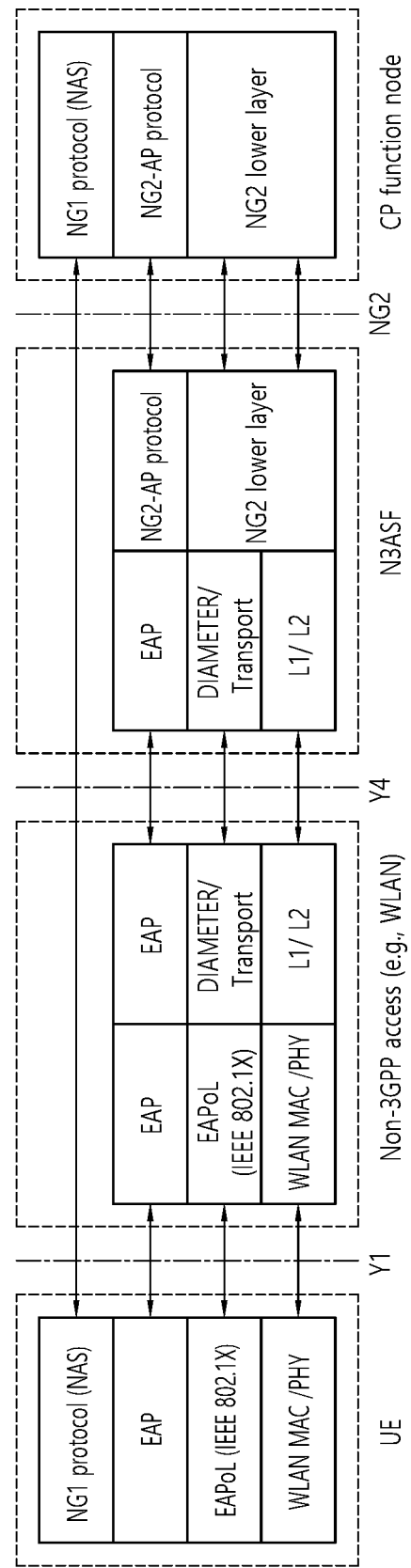
FIG. 8 shows an example of the stack of an NG1 protocol while a UE performs an attach procedure.

FIG. 8 shows an example of the stack of an NG1 protocol while a UE performs an attach procedure.

The shown NG1 protocol is used after the bootstrap of the N3-AS connection shown in FIG. 7.

Meanwhile, in FIGS. 1A, 4A, 4B, 4C, 5A, 5B, 5C, 6, 7, etc., the interface has been named NGx (e.g., NG1, NG2, NG3, . . . ), but the interface may be named Nx (e.g., N1, N1, N3, . . . ).

Figure 9:
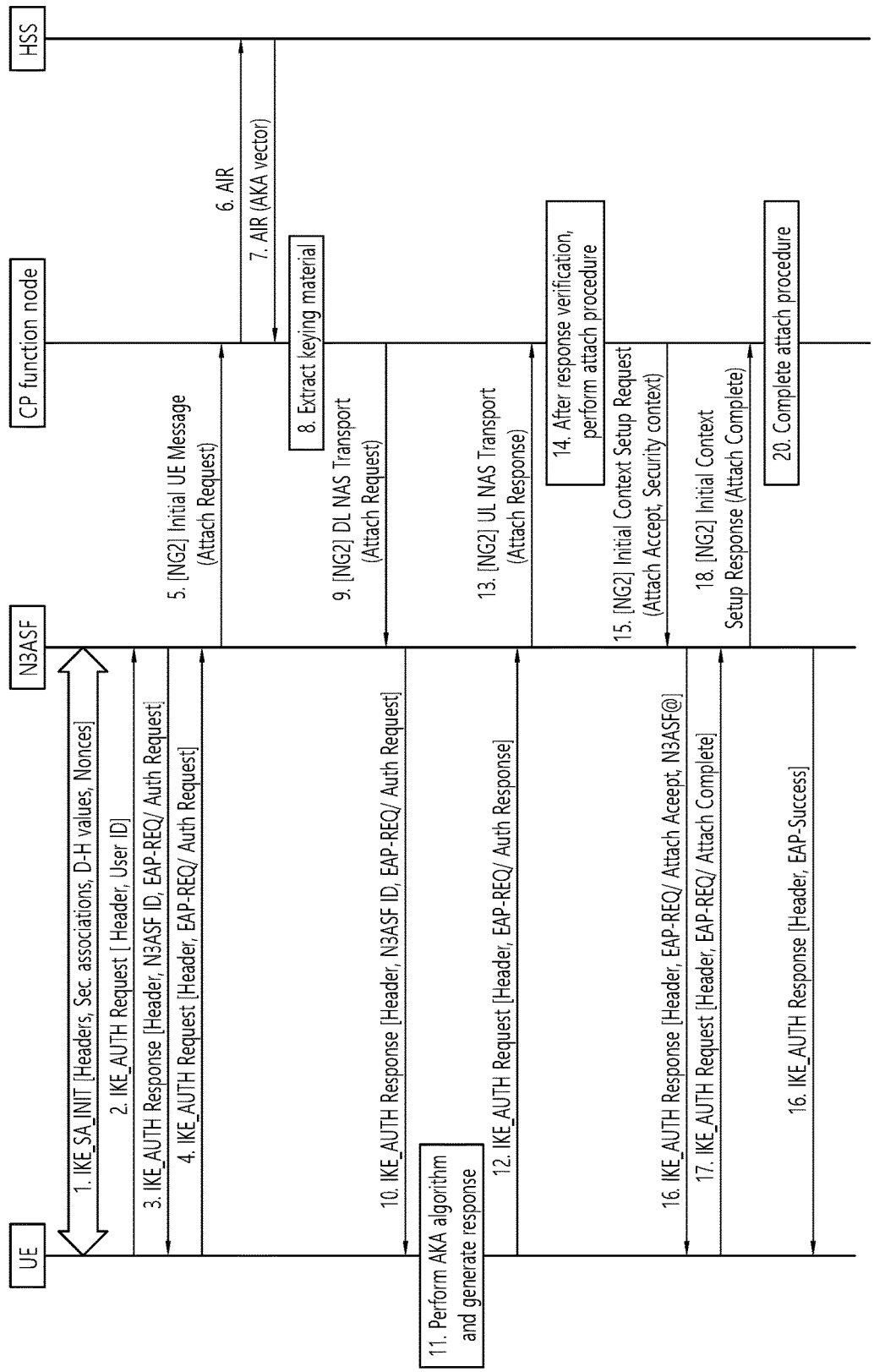
FIG. 9 shows a transfer process of IKEv2 between the UE and the N3ASF when the UE performs an attach procedure through a non-3GPP access in the environment shown in FIG. 5C.

FIG. 9 shows a transfer process of IKEv2 between the UE and the N3ASF when the UE performs an attach procedure through a non-3GPP access in the environment shown in FIG. 5C.

In the example shown in FIG. 9, it is assumed that the following protocols and the following assumptions are used.
An EAP is used within a protocol between the UE and the N3ASF.
The EAP is improved and extended to transmit an NAS message for an attach procedure This is described specifically as follows.

1) Before the UE attempts an IKEv2 connection configuration, the UE may discover the N3ASF. In this case, one of the followings is configured within the UE.
The IP address (or IP address set) of an N3ASF node.
An FQDN (or FQDN set) which may be identified as the IP address of the N3ASF.
A DHCP configuration is used.

3-14) In the shown procedure, in order to minimize a change in the IKEv2 protocol, an NAS message is included in EAP payload and delivered. Alternatively, the NAS message may be directly transmitted through an IKEv2 parameter (e.g., within 3GPP-related IKEv2 configuration payload) or using IPsec transmission.

15) In order to derive a keying material for protecting an N3-AS connection, access-independent security context used by the N3ASF is provided.

When the attach procedure is completed, the UE and the N3ASF use the N3-AS protocol for an additional message exchange (e.g., session management or mobility management procedure).

As described so far, in next-generation mobile communication, it is expected that a UE may generate a plurality of sessions over different access networks.

However, if a UE has a plurality of NG1 connections with a core network, a detailed scheme regarding how the NG1 connections will be processed has not been proposed by a current technology. Furthermore, a detailed scheme for processing the plurality of NG1 connections from the viewpoint of mobility management has not yet been proposed.

Furthermore, a detailed scheme regarding how a CP function node will process a plurality of sessions generated through a plurality of accesses has not been proposed.

Specifically whether one CP function node has to manage a plurality of sessions generated through a plurality of accesses or individual CP function nodes have to manage them has not been specifically determined.

Disclosures of this Specification

Hereinafter, the first disclosure of this specification proposes a method of enabling one CP function node to manage a plurality of sessions generated through a plurality of accesses. Furthermore, the second disclosure of this specification proposes a method for solving a problem from the viewpoint of mobility management when individual CP function nodes control a plurality of sessions generated through a plurality of accesses.

I. The First Disclosure: Method of Using One CP Function Node in Common

According to the first disclosure, there is proposed as follows in order for a plurality of sessions generated through a plurality of accesses to be managed by one CP function node.

1) When a UE connects to a network through a first access, it determines a serving CP function node. In this case, when the UE connects to the network via a second access in the future, one of the following options is performed so that the same CP function node is used.

Option a) The network transmits information on the serving CP function node to the UE. For example, the UE may receive a temporary identifier. The temporary identifier may be unique identifier information used in common in the first access and the second access. The temporary identifier may include the identifier of the serving CP function node and the identifier of the UE. Accordingly, the UE may extract the identifier of the serving CP function node from the received temporary identifier. The UE does not extract the identifier of the serving CP function node, and may use a temporary identifier received from the network without special recognition. Option b) the information on the serving CP function node is stored in a third network node.

2) The UE connects to the network via a second access.

Option a) In this case, the UE recognizes that the connection is a connection through the second access different from a currently connected first access, and transmits required information to the network. More specifically, the UE stores information on a current serving CP function node received from the network, and delivers the information when it connects to the network via the second access. Accordingly, a network node that has been connected to the second access selects and determines the same CP function node based on the information received from the UE. For example, when the UE connects to the network via the second access, it delivers the above-received temporary identifier. Accordingly, the network node that has been connected to the second access extracts the identifier of the serving CP function node from the temporary identifier, and selects and determines a corresponding CP function node.

Option b) When the UE requests a connection from the network via a second access, a network node that has been connected to the second access identifies information stored in a third network node and selects and determines the same CP function node. If a different CP function node has been selected, a CP reallocation process is performed in order to select the same CP function node again.

Meanwhile, one identical CP function node may be divided into a mobility management (MM) function unit and a session management (SM) function unit. In this case, the MM function unit may be one, but the SM function unit may be present in a plural number. In this case, the MM function unit may manage/control a plurality of SM function units. In this case, a message related to session management (SM) like session setup transmitted by a UE may be received in the MM function unit of a serving CP function node and delivered to the SM function unit. If the termination point of an NG1 is used as the MM function unit of a CP function node as described above, it is effective because procedures related to mobility management, such as location registration, can be performed only once. Meanwhile, the same or different SM function unit may be allocated depending on a data network connected by a UE and a network load condition.

Meanwhile, context may be present in a plural number due to connections through a plurality of accesses. Accordingly, the UE and the serving CP function node may check the relation between the plurality of pieces of context and perform update and management, if necessary.

A change in the 3GPP standard contents attributable to the proposal 1 is as follows.

First, one standard document of 3GPP may be changed as follows.

In order to manage a plurality of sessions generated through a plurality of accesses and having individual NG1 connections, one MM CP function node may be used in common. In this case, in order for the plurality of accesses to be managed by one identical CP function node, Option a) When a UE attempts to set up a connection through a first access, information by which a serving CP function unit can be identified may be delivered to the UE. When the UE attempts to set up an additional connection through a second access, it may use the information. A network node that has connected to the second access may allocate the same CP function unit to the UE.

Option 2) When a UE attempts to set up a connection through a first access, information by which a serving CP function unit can be identified is stored in a CP management function unit (e.g., network node playing the role of a home subscriber sever (HSS)). When the UE attempts to set up an additional connection through a second access, the same CP function unit is reallocated to the UE based on the information.

The termination point of the NG1 interface becomes the MM function unit of the CP function node determined by an MM attach procedure (or connection procedure). The MM function unit of the CP function node may deliver the session setup request of the UE to a proper SM function unit of the CP function node (determined based on a requested DN name).

Next, another standard document of 3GPP may be changed as follows.

If a UE can connect to the same 5G core network of a PLMN through a 3GPP access and a non-3GPP access at the same time and if a selected N3IWF is positioned within the same PLMN as the 3GPP access, the UE may be served by one access and mobility function (AMF). In this case, the AMF is a concept similar to that of the above-described MM function unit of the CP function node.

Meanwhile, when a 3GPP access and anon-3GPP access are used by a UE within a PLMN at the same time with respect to a given serving PLMN, one registration management (RM) context may be present for each access of the UE.

The AMF associates the RM context of each of a plurality of accesses of the UE with the followings.

A temporary identifier used in common between a 3GPP access and a non-3GPP access A registration state for each access type (i.e., 3GPP access and non-3GPP access)

A registration area for each access type: one registration area for a 3GPP access and the other registration area for a non-3GPP access A periodic registration timer for a 3GPP access The registration area for a 3GPP access and the registration area for a non-3GPP access are independent.

A UE does not need to perform periodic registration update through a non-3GPP access. Furthermore, a periodic registration timer for a non-3GPP access is not provided to a UE.

The temporary identifier may be allocated or reallocated through a given 3GPP access and non-3GPP access. The AMF allocates only one temporary identifier, which may be used with respect to a 3GPP access and non-3GPP access within the same PLMN, to a UE. The temporary identifier is allocated when a UE is first successfully registered. The temporary identifier is valid with respect to both the 3GPP access and the non-3GPP access within the PLMN. When a UE performs an access through a non-3GPP access or a 3GPP access, the UE may provide a network with a temporary identifier with which the UE has been successfully registered previously within the same PLMN or an equivalent PLMN. By providing the temporary identifier as described above, an access network (AN) can select an AMF that maintains UE context generated in a previous registration procedure, and the AMF can associate a UE request with the existing UE context.

If a UE performs registration through any one access, the UE should not additionally perform registration through a different access at the same time until the registration through any one access is completed.

When a UE is successfully registered through a first access (3GPP access or non-3GPP access) and the UE attempts registration through a different second access:

If the second access is in the same PLMN or an equivalent PLMN, the UE uses a temporary identifier, provided upon previous registration, for registration with a PLMN associated with the second access.

If the second access is positioned in a PLMN (i.e., a PLMN not a registered PLMN) different from the registered PLMN of the first access and the UE has previously performed registration on the different PLMN and thus has a temporary identifier, the UE uses the temporary identifier for registration with a PLMN associated with the second access.

If a temporary identifier allocated during a registration procedure through a 3GPP access is specific to a location, the UE may reuse the same UE temporary identifier through a non-3GPP access only when a selected N3IWF function is present within the same PLMN as that of the 3GPP access. If the temporary identifier has been allocated during a registration procedure for the non-3GPP access and includes a non-geographical group ID, the temporary identifier may not be valid in an NAS procedure through a 3GPP access. Furthermore, the temporary identifier may not be valid if the reallocation of an AMF is necessary during a registration procedure for a 3GPP access.

A registration release request needs to be used along with an indication indicating whether the registration release request has to be performed on only one access or on all accesses.

If a UE has been registered with both 3GPP and non-3GPP accesses and the UE is in an idle state in the non-3GPP access, the UE or an AMF may start a registration release procedure through the 3GPP access so that the UE is registered or released only on the non-3GPP.

Figure 10:
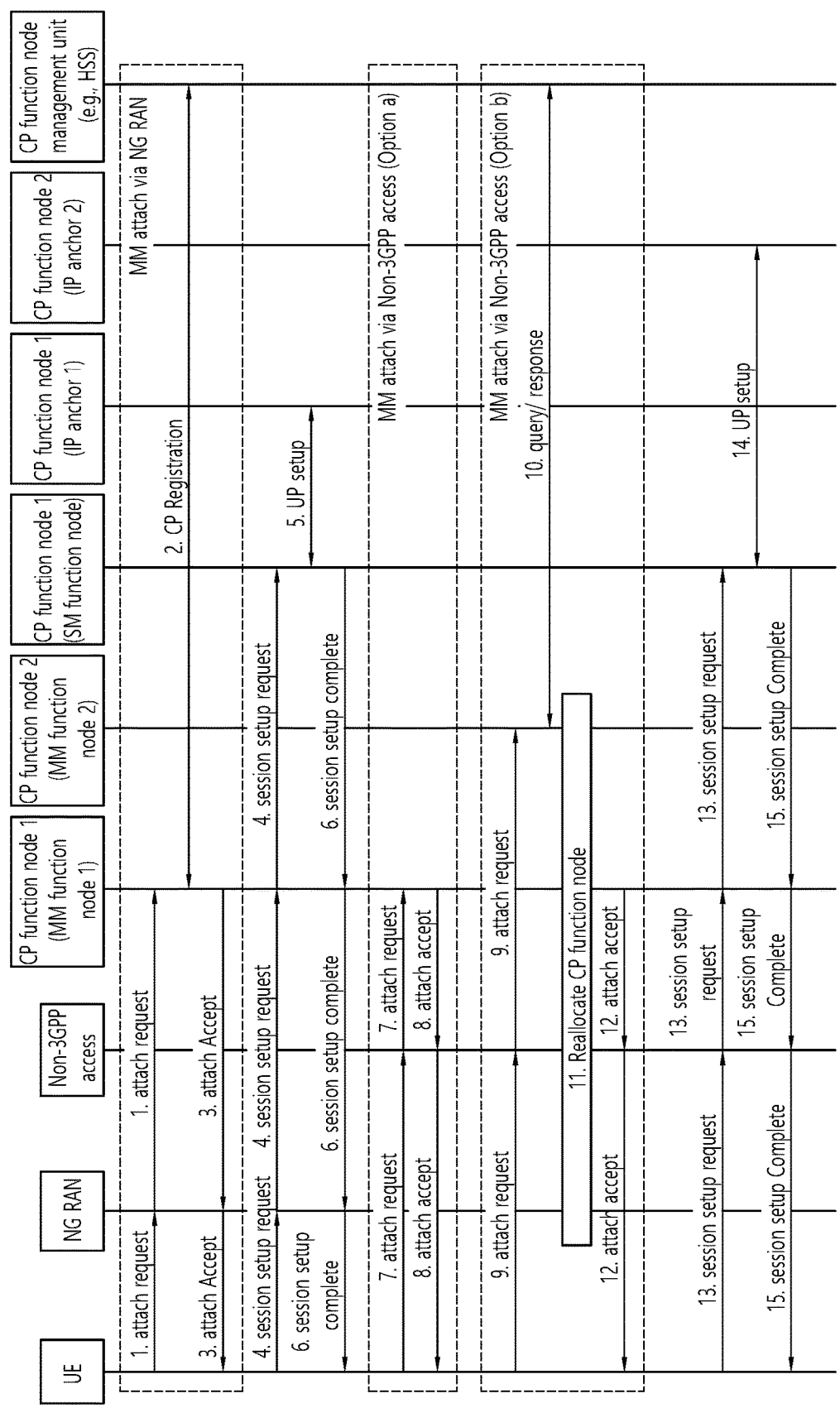
FIG. 10 is an illustrative flowchart showing a procedure according to a first disclosure.

FIG. 10 is an illustrative flowchart showing a procedure according to a first disclosure.

1) First, a UE transmits a connection request message (or registration request message), for example, a shown attach request message through a 3GPP access (e.g., shown NG RAN). The 3GPP access (e.g., shown NG RAN) allocates a CP function node 1 and delivers the connection request message (or registration request message), for example, the attach request message. Detailed contents thereof follow the existing contents related to an MM procedure, such as an attach procedure. The CP function node 1, as described above, may be divided into an MM function unit 1 and an SM function unit. In this case, the connection request message (or registration request message), for example, the attach request message may be delivered to the MM function unit 1 of the CP function node 1.

2) The MM function unit 1 of the CP function node 1 may register that it is the serving CP function node of the UE with a CP management function (e.g., HSS or user data management server).

3) The MM function unit 1 of the CP function node 1 transmits a connection accept message (or registration accept message), for example, an attach accept message to the UE through a 3GPP access, for example, the shown NG RAN. The connection accept message (or registration accept message), for example, the attach accept message includes information to identify the current serving CP function node.

4) When the CP function node, that is, the termination point of an NG1 interface, is divided into Ol the MM function unit 1 and the SM function unit as described above, the UE transmits a session setup request message to the MM function unit 1 of the CP function node 1 through a 3GPP access (e.g., shown NG RAN). The session setup request message is received by the MM function unit 1 and delivered to a proper SM function unit (determined based on a requested DN name).

5~6) The SM function unit of the CP function node selects a proper user plane function and starts a user plane configuration, and thus the configuration of the user plane is completed.

7) Meanwhile, the UE transmits a connection request message (or registration request message), for example, an attach request message over a non-3GPP access network. In this case, the connection request message (or registration request message), for example, the attach request message may include an indication indicating that it is additional attach. Furthermore, the connection request message (or registration request message), for example, the attach request message may include identifier information of the CP function node 1 received in the 3 process.

8) The identifier information of the CP function node 1 is used for the non-3GPP access network to allocate the same CP function node 1 to the UE again. The same CP function node 1 transmits a connection accept message (or registration accept message), for example, an attach accept message.

9) The UE transmits an additional connection request message (or registration request message), for example, an attach request message over the non-3GPP access network. In this case, the connection request message (or registration request message), for example, the attach request message may include an indication indicating that it is additional attach. In this case, the connection request message (or registration request message), for example, the attach request message does not include the identifier information of the CP function node 1 received in the 3 process. Accordingly, the non-3GPP access allocates a different CP function node 2, and delivers the connection request message (or registration request message), for example, the attach request message to the MM function unit 2 of the different CP function node 2.

10-11) The MM function unit 2 of the different CP function node 2 identifies whether there is a CP function node previously allocated to the UE by performing a query/response on a CP function node management unit. If a CP function node previously allocated to the UE is present, a reallocation procedure is performed.

12) The MM function unit 1 of the CP function node 1 transmits a connection accept message (or registration accept message), for example, an attach accept message to the UE.

13) When the CP function node, that is, the termination point of an NG1 interface, is divided into the MM function unit 1 and the SM function unit as described above, the UE transmits a session setup request message to the MM function unit 1 of the CP function node 1 through the non-3GPP access. The session setup request message is received by the MM function unit 1 and then delivered to a proper SM function unit (determined based on a requested DN name).

14-15) The SM function unit of the CP function node selects a proper user plane function and starts a user plane configuration, and thus the configuration of the user plane is completed.

Meanwhile, the above-described operation is described as follows from the viewpoint of a CP function node. However, as described above, the CP function node may also be called an AMF. Furthermore, the CP function node or the AMF may include a transceiver, a processor, and storage means as described later with reference to FIG. 13. Accordingly, operations performed by the respective units of the CP function node or the AMF are specifically arranged and described below.

1) The transceiver of the CP function node (or AMF) receives a connection request message or an attach request message as an example of a registration request message from a UE.

2) The processor of the CP function node (or AMF) identifies whether an access network that has delivered the registration request message, for example, a connection request message or an attach request message is a 3GPP access or a non-3GPP access. This is possible by checking header information of an N2 interface message between the access network and the CP function node (or AMF).

3) The processor of the CP function node (or AMF) identifies whether there is a session previously connected over another access network by identifying UE context information stored in the storage means. The CP function node (or AMF) may store and manage context for the registration management (RM) context/connection management (CM) context management of the UE in the storage means for each access. Accordingly, in the case of a request by a new access, the processor of the CP function node (or AMF) determines that additional context information needs to be stored.

Meanwhile, if the context for the registration management (RM) context/connection management (CM) context management of the UE has been stored in a different node not the storage means of the CP function node (or AMF), the processor of the CP function node (or AMF) performs an interaction with the different node through the transceiver.

If information on the results of the execution of registration over another access network by the UE has been stored in the storage means of the CP function node (or AMF) or the different node, the processor of the CP function node (or AMF) may determine whether a temporary identifier (including the identifier of the CP function node), allocated to the UE in a previous registration process, and a temporary identifier (including the identifier of the CP function node) included in a connection request message (or registration request message), for example, an attach request message transmitted by the UE are the same.

If the UE has transmitted a connection request message (or registration request message), for example, an attach request message, including the temporary identifier, to the CP function node (or AMF) although the CP function node (or AMF) has not previously registered the UE, the processor of the CP function node (or AMF) considers it as an abnormal error and may transmit a reject message to the UE. In this case, a value indicating that the UE has not been previously registered may be configured in a cause field within the reject message.

Alternatively, if the CP function node (or AMF) has previously registered the UE and allocated a temporary identifier 1 to the UE, but a temporary identifier 2 different from the temporary identifier 1 is included in a connection request message (or registration request message), for example, an attach request message transmitted by the UE, the processor of the CP function node (or AMF) considers it as an abnormal error, may generate a cause value for registration rejection, and may transmit a reject message to the UE. In this case, a value indicating that the temporary identifier is erroneous may be configured in a cause field within the reject message. Furthermore, the temporary identifier 1 may be included as a correct temporary identifier of the UE within the reject message.

4) The processor of the CP function node (or AMF) performs a registration procedure by performing an interaction with nodes with other CP function through the transceiver (e.g., subscriber information identification and UE location information registration through an interaction with UDM including subscriber information).

5) The processor of the CP function node (or AMF) generates a connection accept message (or registration accept message), for example, an attach accept message, and transmits it to the UE. In this case, if the UE has not been previously registered, the processor of the CP function node (or AMF) newly allocates a temporary identifier (including the identifier of the CP function node) for the UE, and includes the newly allocated temporary identifier in a connection accept message (or registration accept message), for example, an attach accept message. In contrast, if the UE has been previously registered, a previously allocated temporary identifier is included in the connection accept message (or registration accept message), for example, the attach accept message.

II. Second Disclosure: Method Using Individual CP Function Node

The second disclosure of this specification proposes a method for solving a problem from the viewpoint of mobility management when a plurality of sessions generated through a plurality of accesses is controlled by individual CP function nodes.

Figure 11A:
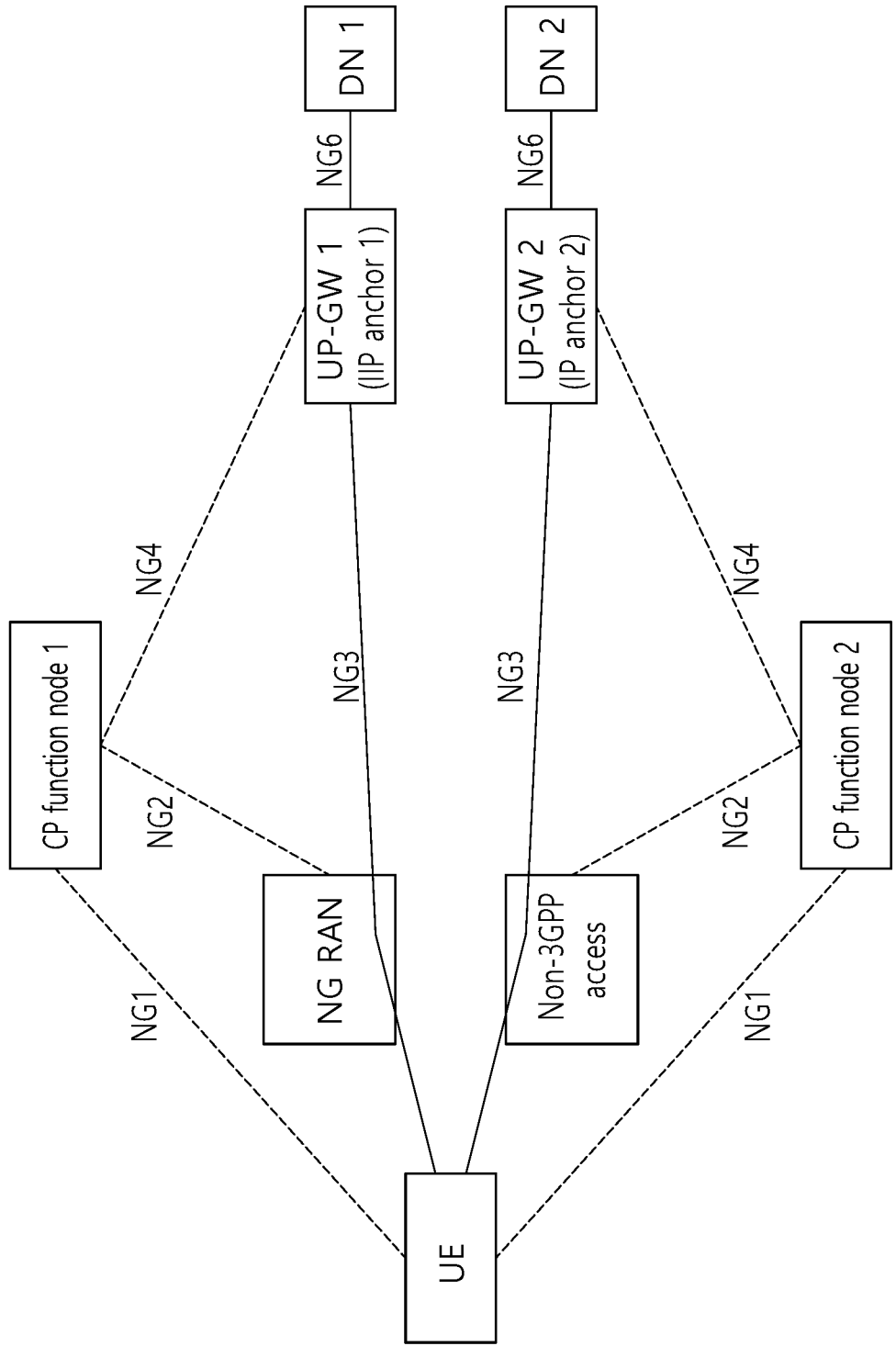
FIGS. 11A and 11B are exemplary diagrams showing architecture according to a second disclosure.
Figure 11B:
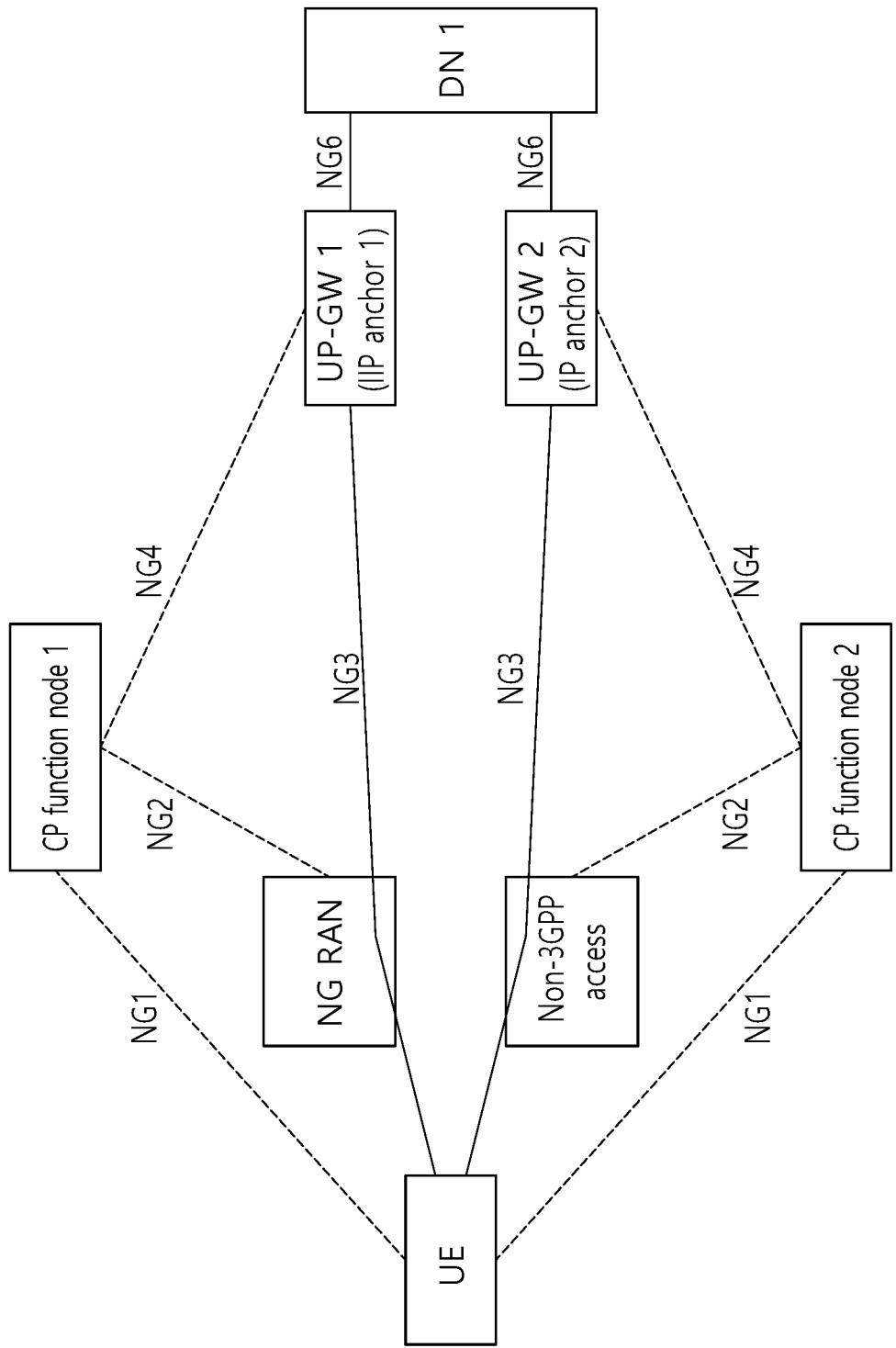

FIGS. 11A and 11B are exemplary diagrams showing architecture according to a second disclosure.

The architecture shown in FIGS. 11A and 11B is architecture in which a plurality of the following sessions is taken into consideration.

- a plurality of sessions toward different data networks through different accesses
- a plurality of sessions toward the same data network through different accesses The shown architecture is for performing session management under the following assumption.

- A UE may have a plurality of sessions toward different data networks or the same data network through a plurality of accesses.
- A UE may have a plurality of sessions through a 3GPP access (e.g., shown NG RAN) and over a non-3GPP access network.
- The setup and release of a session through the NG RAN may be performed through NG1 signaling.
- The setup and release of a session through a non-3GPP access may also be performed through NG1 signaling.
- SM context must have the access network type of information for a plurality of sessions.
- Individual CP function nodes may be present for each access network. In this case, a CP function, that is, the termination point of an NG1, may be different.
- The MM function unit of a CP function node, that is, the termination point of an NG1 interface, may deliver a session setup request message to a proper SM function unit.

Figure 12:
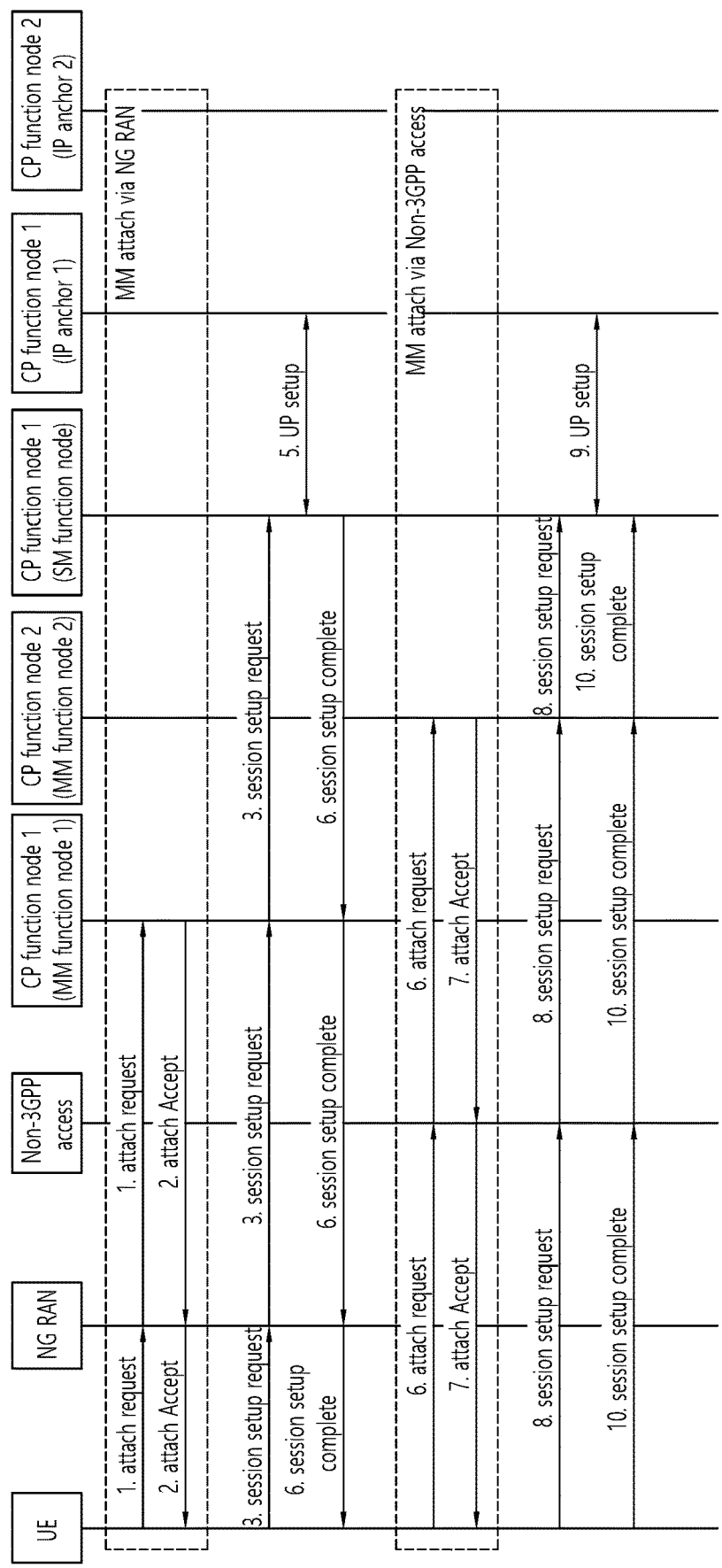
FIG. 12 is an illustrative flowchart showing according to a procedure according a second disclosure.

FIG. 12 is an illustrative flowchart showing according to a procedure according a second disclosure.

1) First, a UE transmits a connection request message (or registration request message), for example, a shown attach request message through a 3GPP access (e.g., shown NG RAN). The 3GPP access (e.g., shown NG RAN) allocates a CP function node 1 and delivers the connection request message (or registration request message), for example, the attach request message, and detailed contents thereof follow the existing contents related to an MM procedure, such as an attach procedure. The CP function node 1, as described above, may be divided into an MM function unit 1 and an SM function unit. In this case, the connection request message (or registration request message), for example, the attach request message may be delivered to the MM function unit 1 of the CP function node 1.

2) The MM function unit 1 of the CP function node 1 transmits a connection accept message (or registration accept message), for example, an attach accept message to the UE through a 3GPP access, for example, the shown NG RAN.

3) When the CP function node, that is, the termination point of an NG1 interface, is divided into the MM function unit 1 and the SM function unit as described above, the UE transmits a session setup request message to the MM function unit 1 of the CP function node 1 through a 3GPP access (e.g., shown NG RAN). The session setup request message is received by the MM function unit 1 and delivered to a proper SM function unit (determined based on a requested DN name).

4~5) The SM function unit of the CP function node selects a proper user plane function and selects a user plane configuration, and thus the configuration of the user plane is completed.

6) Meanwhile, the UE transmits a connection request message (or registration request message), for example, an attach request message over a non-3GPP access network. In this case, the connection request message (or registration request message), for example, the attach request message may include an indication indicating that it is an additional connection (or additional attach). The non-3GPP access allocates a different CP function node 2, and delivers the connection request message (or registration request message), for example, the attach request message to the MM function unit 2 of the different CP function node 2.

7) The MM function unit 2 of the CP function node 2 transmits a connection accept message (or registration accept message), for example, an attach accept message to the UE.

8) The UE transmits a session setup request message to the MM function unit 2 of the CP function node 2 through a non-3GPP access. The session setup request message is received by the MM function unit 2 and delivered to a proper SM function unit (determined based on a requested DN name).

The contents described so far may be implemented by hardware. This is described below with reference to FIG. 10.

Figure 13:
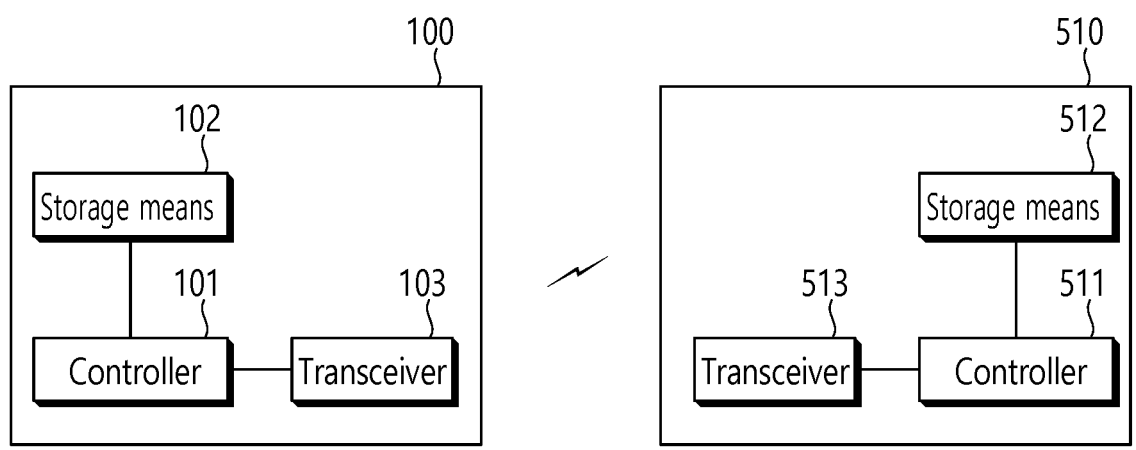
FIG. 13 is a block diagram of the configuration of a UE 100 and network node according to an embodiment of the present invention.

FIG. 13 is a block diagram of the configuration of a UE 100 and network node according to an embodiment of the present invention.

As shown in FIG. 13, the UE 100 includes storage means 101, a controller 102 and a transceiver 103. Furthermore, the network node may be an access network (AN), an NG RAN of 3GPP or a CP function node. The network node includes storage means 511, a controller 512 and a transceiver 513.

The storage means store the above-described methods.

The controllers control the storage means and the transceivers. Specifically, the controllers execute the methods stored in the storage means. Furthermore, the controllers transmit the above-described signals through the transceivers.

Although the preferred embodiments of the present invention have been illustrated, the scope of the present invention is not limited to only such specific embodiments, and the present invention may be modified, changed or improved in various forms within the spirit of the present invention and a category written in the claims.

What is claimed is:

1. A method for performing access to a network, the method performed by a user equipment (UE) and comprising:
    determining whether a first connection has been previously performed through a first access when attempting to perform a second connection through a second access; and
    transmitting an attach request message comprising identifier information of a control plane (CP) function node if the first connection through the first access has been performed and the second connection through the second access is determined to be additional,
    wherein the identifier information of the control plane (CP) function node has been obtained in a process of performing the first connection through the first access, and
    both the first connection through the first access and the second connection through the second access are managed by the control plane (CP) function node.

2. The method of claim 1, further comprising:
    transmitting a connection request message in order to perform the first connection through the first access; and
    receiving an accept message comprising the identifier information of the control plane (CP) function node as a response to the request message.

3. The method of claim 2, wherein:
    the connection request message comprises a registration request message or an attach request message, and
    the accept message comprises a registration accept message or an attach accept message.

4. The method of claim 1, wherein:
    the first access is a next-generation access network defined based on a 3rd generation partnership project (3GPP), and
    the second access is a non-3GPP-based access network.

5. The method of claim 4, wherein the identifier information of the control plane (CP) function node is unique identifier information used in common in a next-generation access network defined based on the 3GPP and the non-3GPP-based access network.

6. The method of claim 1, further comprising transmitting a connection request message not comprising the identifier information if the first connection through the first access has not been performed and the second connection through the second access is determined to be first.

7. The method of claim 1, further comprising receiving a reject message as a response to the connection request message,
    wherein the reject message comprises a cause field in which a value indicating that the UE has not been previously registered or a value indicating that the identifier information is erroneous has been configured.

8. A user equipment (UE) for performing a connection to a network, comprising:
    a transceiver; and
    a processor controlling the transceiver,
    wherein the processor performs a process of determining whether a first connection has been previously performed through a first access when attempting to perform a second connection through a second access, and
    a process of transmitting an attach request message comprising identifier information of a control plane (CP) function node if the first connection through the first access has been performed and the second connection through the second access is determined to be additional,
    the identifier information of the control plane (CP) function node has been obtained in a process of performing the first connection through the first access, and
    both the first connection through the first access and the second connection through the second access are managed by the control plane (CP) function node.

9. The UE of claim 8, wherein the processor further performs:
    a process of transmitting a connection request message in order to perform the first connection through the first access; and
    a process of receiving an accept message comprising the identifier information of the control plane (CP) function node as a response to the request message.

10. The UE of claim 8, wherein:
    the first access is a next-generation access network defined based on a 3rd generation partnership project (3GPP), and
    the second access is a non-3GPP-based access network.

11. The UE of claim 10, wherein the identifier information of the control plane (CP) function node is unique identifier information used in common in a next-generation access network defined based on the 3GPP and the non-3GPP-based access network.

12. The UE of claim 8, wherein the processor further performs a process of transmitting a connection request message not comprising the identifier information if the first connection through the first access has not been performed and the second connection through the second access is determined to be first.

* * * * *